United States Patent
Tajima et al.

(10) Patent No.: US 7,318,969 B2
(45) Date of Patent: Jan. 15, 2008

(54) FUEL CELL

(75) Inventors: Nobuyasu Tajima, Ome (JP); Eiichi Sakaue, Tokyo (JP); Kei Matsuoka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 26 days.

(21) Appl. No.: 11/349,392

(22) Filed: Feb. 7, 2006

(65) Prior Publication Data

US 2006/0177713 A1 Aug. 10, 2006

(30) Foreign Application Priority Data

Feb. 8, 2005 (JP) ............................. 2005-032038

(51) Int. Cl.
*H01M 8/00* (2006.01)

(52) U.S. Cl. .......................................... 429/12; 429/13

(58) Field of Classification Search .................. 429/12, 429/13, 26, 34, 36, 38
See application file for complete search history.

(56) References Cited

U.S. PATENT DOCUMENTS

2006/0177712 A1* 8/2006 Hirayama .................... 429/26

FOREIGN PATENT DOCUMENTS

| JP | 2000-331703 | 11/2000 |
|---|---|---|
| JP | 2004-087159 | 3/2004 |
| JP | 2004-095376 | 3/2004 |
| JP | 2004-265787 | 9/2004 |

\* cited by examiner

*Primary Examiner*—Patrick Joseph Ryan
*Assistant Examiner*—Monique Wills
(74) *Attorney, Agent, or Firm*—Blakely, Sokoloff, Taylor & Zafman LLP

(57) ABSTRACT

According to one embodiment, a fuel cell includes an electromotive section, a fuel tank, an anode line through which a fuel is circulated between the electromotive section and the fuel tank, an air supply section, a cathode line which is connected to the electromotive section and through which products from the electromotive section are discharged, a cooler which is provided in the cathode line, cools the products, and condenses water, and an exhaust filter provided in the cathode line. The fuel cell has a reservoir portion which stores the condensed water and water discharged from the electromotive section, a first recovery line through which the water stored in the reservoir portion is guided into the fuel tank, and a second recovery line through which the water produced in the cathode line is guided into the reservoir portion between the cooler and the exhaust filter.

5 Claims, 5 Drawing Sheets

$CH_3OH + H_2O \rightarrow CO_2 + 6H^+ + 6e^-$ $6H^+ + 3/2 O_2 + 6e^- \rightarrow 3H_2O$

FUEL CELL

CROSS-REFERENCE TO RELATED APPLICATIONS

This application is based upon and claims the benefit of priority from prior Japanese Patent Application No. 2005-032038, filed Feb. 8, 2005, the entire contents of which are incorporated herein by reference.

BACKGROUND

1. Field

The present invention relates to a fuel cell used as a power source for an electronic device, etc.

2. Description of the Related Art

Presently, a secondary battery, e.g., a lithium ion battery, is mainly used as a power source for electronic devices, such as portable notebook personal computers (notebook PCs), mobile devices, etc. In recent years, high-output miniature fuel cells that require no charging are expected as novel power sources, based on a demand for increased power consumption and prolonged operating time that are required by enhanced functions of the electronic devices. Among various types of fuel cells, a direct methanol fuel cell (DMFC) that uses a methanol solution as its fuel can handle the fuel more easily and has a simpler system than fuel cells that use hydrogen as their fuel. Accordingly, the DMFC is noticed as a promising power source for the electronic devices.

Normally, the DMFC comprises a fuel tank containing high-concentration methanol, a mixing tank in which the methanol in the fuel tank is diluted with water, a liquid pump for forcing the diluted methanol into an electromotive section, an air pump for feeding air into the electromotive section, etc. The electromotive section has an anode and a cathode and generates electric power through a chemical reaction by supplying air to the cathode side. As products of the reaction for the power generation, carbon dioxide and water are produced on the anode and cathode sides, respectively, of the electromotive section. The water as a reaction product is reduced to steam and discharged. The steam from the cathode side of the electromotive section is fed into a cooler through a cathode line, whereupon it is cooled and condensed into water. The resulting water is recovered and used to dilute the methanol. According to a fuel cell described in Jpn. Pat. Appln. KOKAI Publication No. 2004-95376, for example, an exhaust filter for removing toxic substances is provided on the downstream side of a cooler. In this arrangement, exhaust gas from the cathode side is cleared of toxic substances by the exhaust filter after passing through the cooler and then discharged to the outside.

In the fuel cell constructed in this manner, the cathode-side exhaust gas having passed through the cooler is further condensed into dew as it is cooled in the cathode line. Some of the water condensed in the cooler is blown up by the exhaust gas and discharged in splashes. Accordingly, the water flows through the cathode line into the exhaust filter, thereby wetting the filter. In consequence, there is a problem that the performance of the exhaust filter is lowered considerably.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a fuel cell comprises: an electromotive section which generates electric power through a chemical reaction; a fuel tank which contains a fuel; an anode line through which the fuel is circulated between the electromotive section and the fuel tank; an air supply section which supplies air to the electromotive section; a cathode line which is connected to the electromotive section and through which products from the electromotive section are discharged; a cooler which is arranged in the cathode line, cools the products, and condenses water; an exhaust filter provided in the cathode line on the downstream side of the cooler; a reservoir portion which stores the condensed water and water discharged from the electromotive section; a first recovery line through which the water stored in the reservoir portion is guided into the fuel tank; and a second recovery line through which the water produced in the cathode line is guided into the reservoir portion between the cooler and the exhaust filter.

A fuel cell according to an embodiment of this invention will now be described in detail with reference to the accompanying drawings.

Figure 1:
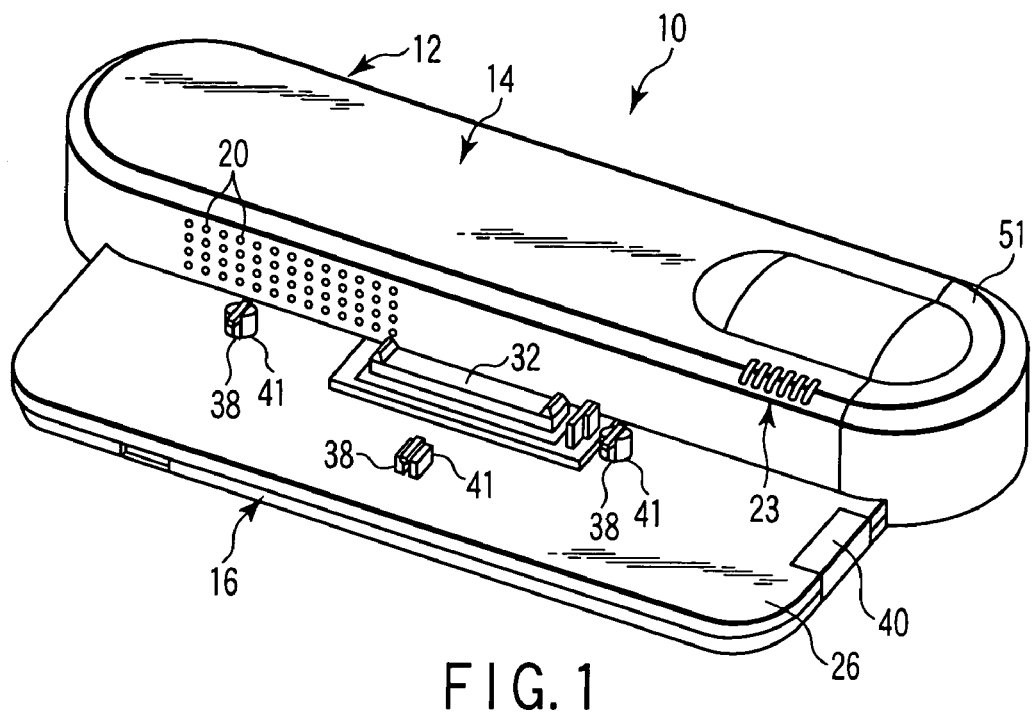
FIG. 1 is an exemplary perspective view showing a fuel cell according to an embodiment of the invention.
Figure 2:
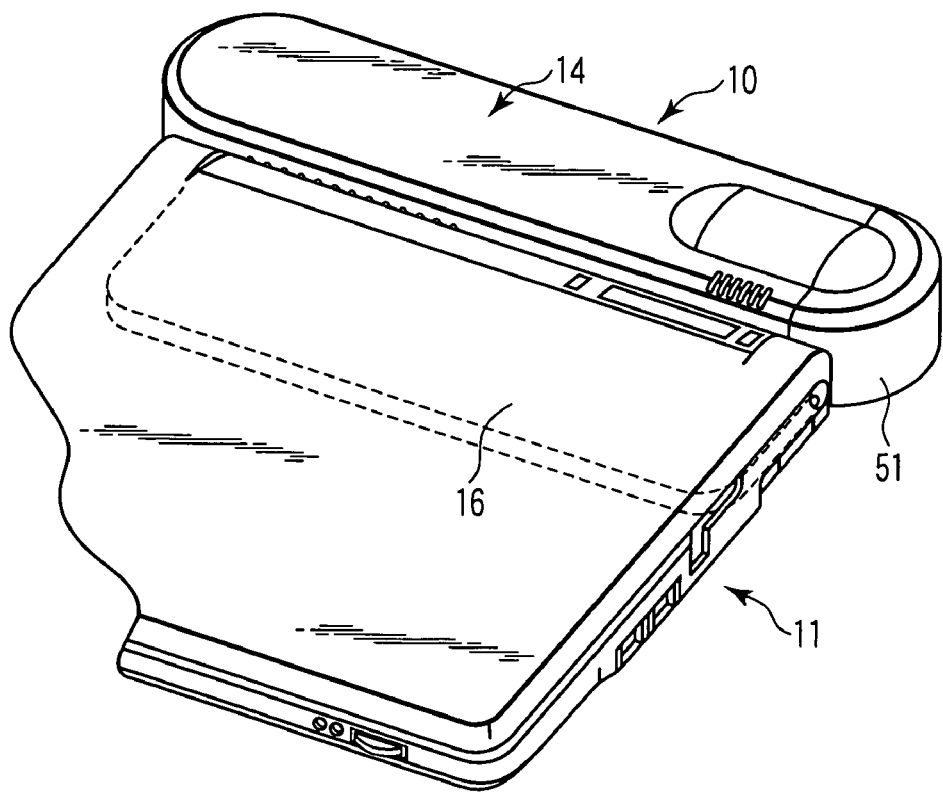
FIG. 2 is an exemplary perspective view showing the fuel cell connected to a personal computer.
Figure 3:
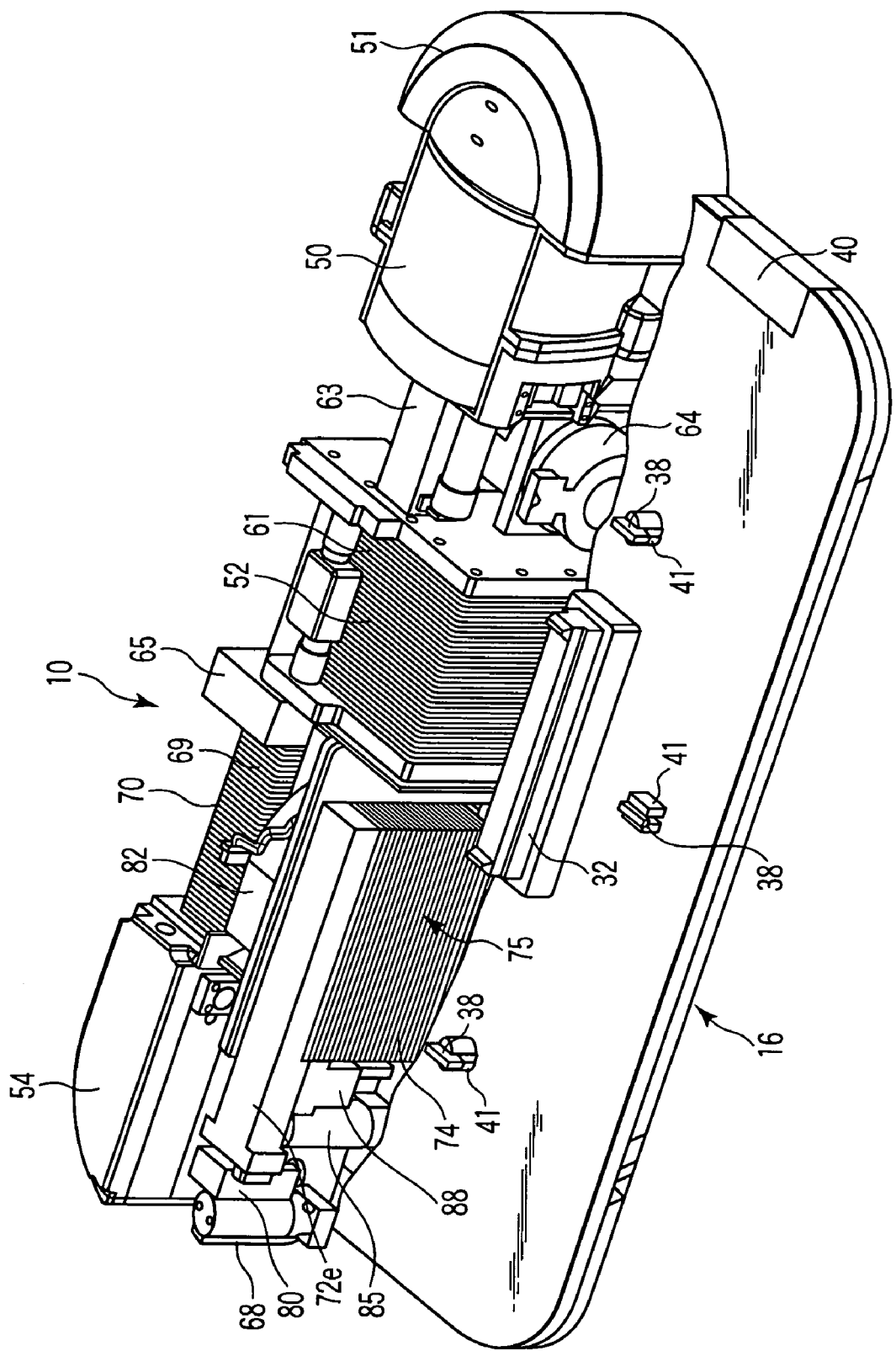
FIG. 3 is an exemplary perspective view showing a power generation section of the fuel cell.

As shown in FIGS. 1 to 3, a fuel cell 10 is constructed as a DMFC that uses methanol as a liquid fuel and is usable as a power source for an electronic device, such as a personal computer 11.

The fuel cell 10 is provided with a case 12. The case 12 has a horizontally extending body 14 substantially in the form of a prism and a bearer portion 16 that extends from the body. The bearer portion 16, which is in the form of a flat rectangle, can carry a rear part of the computer 11. As described later, the body 14 contains therein a fuel tank, electromotive section, mixing tank, etc. A lock mechanism for locking the computer 11 and the like are located on the bearer portion 16.

As shown in FIGS. 1 to 3, a connector 32 for connection with the personal computer 11 is provided on the upper surface of the bearer portion 16. A connector (not shown) for connection with the connector 32 of the fuel cell 10 is provided on a rear part of, for example, the bottom surface of the computer 11 and is connected mechanically and electrically to the connector 32. Positioning projections 41 and hooks 38 that constitute the lock mechanism are provided on three spots of the bearer portion 16. The positioning projections 41 and the hooks 38 engage the rear part of the bottom surface of the computer 11, thereby positioning and holding the computer 11 on the bearer portion 16. Further, the bearer portion 16 is provided with an eject button 40 that is used to unlock the lock mechanism in disengaging the computer 11 from the fuel cell 10. The bearer portion 16 has therein a control section for controlling the operation of a power generation section, which will be described later.

Figures 5, 6:
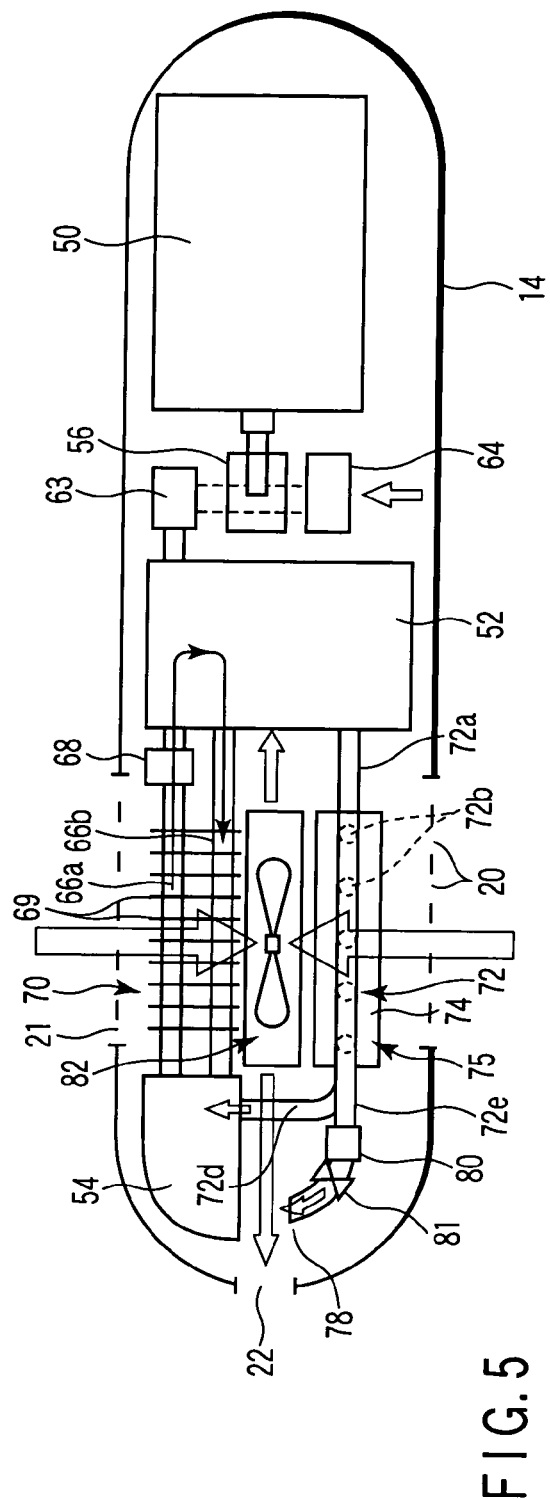
FIG. 5 is an exemplary view schematically showing the power generation section of the fuel cell.
FIG. 6 is an exemplary diagram typically showing a cell structure of an electromotive section of the fuel cell.

As shown in FIGS. 1 and 5, a wall portion of the body 14 is formed with a number of vents including vents 20. As described later, a fuel tank 50 that constitutes the power generation section is constructed as a removable fuel cartridge. One side portion of the body 14 is formed as a cover 51 that can be removed when the fuel tank 50 is detached.

Figure 4:
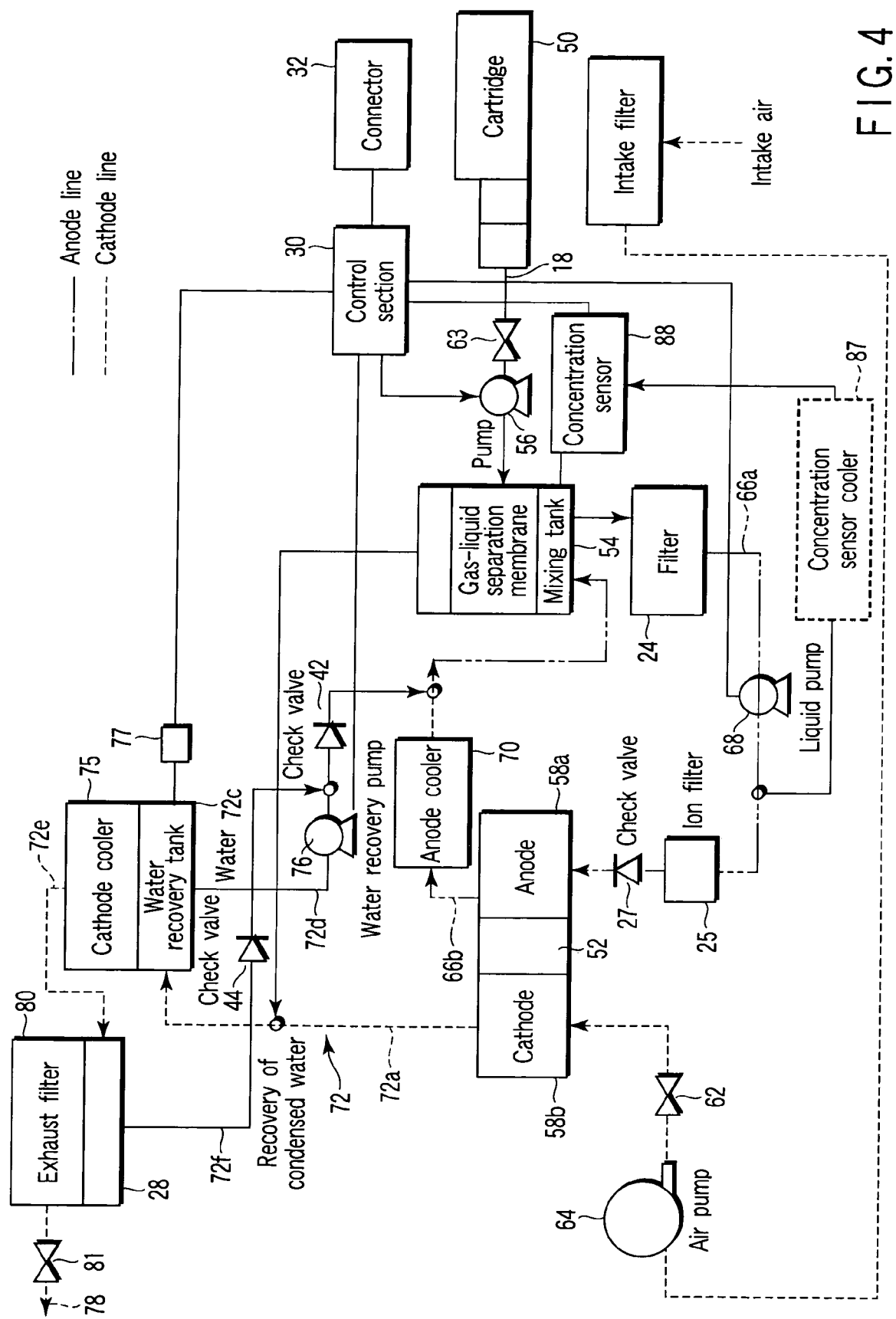
FIG. 4 is an exemplary system diagram mainly showing a configuration of the power generation section of the fuel cell.

The configuration of the power generation section will now be described in detail. FIG. 4 is a system diagram mainly showing the power generation section, especially details of an electromotive section 52 formed of a DMFC stack and accessories around it. As shown in FIGS. 3, 4, and 5, the power generation section comprises the fuel tank 50, the electromotive section 52, a mixing tank 54, an anode cooler 70, and a cathode cooler 75. The fuel tank 50 is provided in one side portion of the body 14. The electromotive section 52 is located in the central part of the body 14 and performs power generation based on a chemical reaction. The mixing tank 54 is disposed between the electromotive section and the fuel tank. The coolers 70 and 75 are arranged in the other side portion of the body. The fuel tank 50 contains high-concentration methanol for use as a liquid fuel. The tank 50 is formed as a cartridge that can be attached to and detached from the body 14.

The fuel tank 50 is connected to the mixing tank 54 by a fuel supply line 18, which is provided with a first liquid pump 56, which feeds a fuel from the fuel tank into the mixing tank, and a solenoid valve 63. As shown in FIG. 6, the electromotive section 52 is formed by stacking cells in layers. Each cell is formed of an anode (fuel electrode) 58a, a cathode (air electrode) 58b, and an electrolyte membrane 60 sandwiched between the electrodes. A number of cooling fins 61 are arranged around the electromotive section 52.

As shown in FIGS. 3 to 5, the body 14 contains therein an air pump 64, which supplies air to the cathode 58b of the electromotive section 52 through an air valve 62. The air pump 64 constitutes an air supply section. A fuel supply pipe 66a and a fuel recovery pipe 66b are connected between the electromotive section 52 and the mixing tank 54, and form an anode line through which the fuel is circulated between the anode 58a of the electromotive section and the tank 54. The fuel supply pipe 66a is connected with a filter 24, a second liquid pump 68, an ion filter 25, and a check valve 27. The pump 68 delivers the fuel from the mixing tank 54 to the electromotive section 52. A large number of vertically extending radiator fins 69 are mounted around the fuel supply pipe 66a and the fuel recovery pipe 66b and constitute an anode cooler 70.

Figure 7:
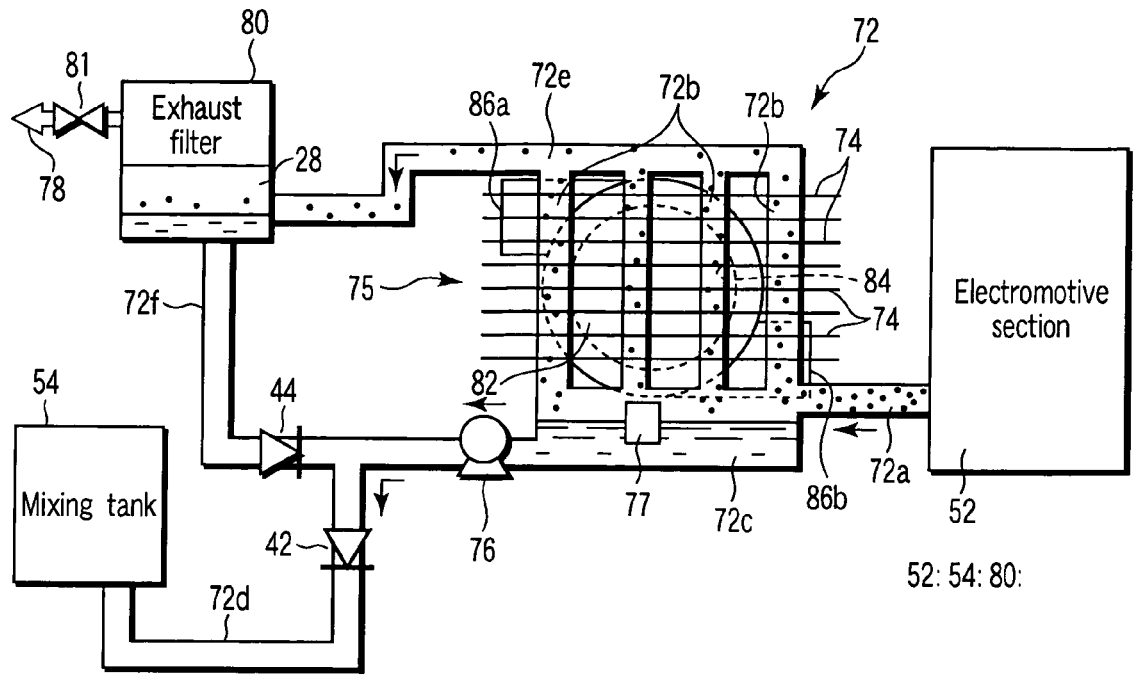
FIG. 7 is an exemplary diagram typically showing a cathode line and a cathode cooler of the fuel cell.

As shown in FIGS. 4, 5 and 7, an exhaust pipe 72 is connected to the electromotive section 52 and forms a cathode line through which air and products of power generation are discharged from the cathode 58b. The cathode line has a first line 72a extending from the electromotive section 52, a plurality of branch lines 72b, a reservoir portion (water recovery tank) 72c, a first recovery line 72d, and a second line 72e. The branch lines 72b diverge from the first line 72a and extend individually at an angle to the horizontal direction. The reservoir portion 72c communicates with the first line 72a and the respective lower ends of the branch lines 72b and stores water discharged from the first line and water condensed in the branch lines. The first recovery line 72d guides the water stored in the reservoir portion 72c into the mixing tank 54. The second line 72e opens into the respective upper ends of the branch lines 72b. In the present embodiment, the branch lines 72b individually extend in the vertical direction. Further, the first recovery line 72d communicates with the fuel recovery pipe 66b between the anode cooler 70 and the mixing tank 54, and is connected to the mixing tank by the fuel recovery line.

The first recovery line 72d is provided with a water recovery pump 76, which supplies the water in the reservoir portion 72c to the mixing tank 54. Further, the reservoir portion 72c contains therein a water level sensor 77 for detecting the level of the water stored in the reservoir portion.

A number of horizontally extending radiator fins 74 are mounted around the exhaust pipe 72 that defines the branch lines 72b, thus constituting a cathode cooler 75. The cathode cooler 75 that includes the branch lines 72b is opposed to the anode cooler 70 with a gap between the two. The second line 72e extends substantially horizontally and is provided with an exhaust port 78 that opens toward the vent 22 of the body 14. The vents 20 in a front wall of the body 14 are opposed to the cathode cooler 75.

In the second line 72e, an exhaust filter 80 and an exhaust valve 81 are located near the exhaust port 78. The exhaust filter 80 is formed of, for example, a metal catalyst or the like and serves to remove toxic substances such as methanol in the air that is discharged through the cathode line. A water recovery portion 28 is provided vertically under the exhaust filter 80 and communicates with the second line 72e. The cathode line has a second recovery line 72f through which the water recovered in the water recovery portion 28 is led to the first recovery line 72d. The second recovery line 72f is connected to the first recovery line 72d between the water recovery pump 76 and the mixing tank 54.

Between the water recovery pump 76 and the mixing tank 54, the first recovery line 72d is provided with a check valve 42 that restrains the water from flowing back from the mixing tank 54 toward the pump 76. Between the check valve 42 and the water recovery portion 28, the second recovery line 72f is provided with a check valve 44 that restrains the water from flowing back from the pump 76 to the water recovery portion 28.

In the body 14, as shown in FIGS. 5 and 7, a cooling fan 82, a centrifugal fan, is located between the anode cooler 70 and the cathode cooler 75 so as to face the anode and cathode coolers. In the fan 82, a rotating shaft for its blades is located substantially horizontally and at right angles to the anode cooler 70 and the cathode cooler 75. As is evident from FIG. 7, the cooling fan 82 has a case that covers the blades. The case is formed having suction ports 84 that are opposed to the anode cooler 70 and the cathode cooler 75, individually, and two exhaust ports 86a and 86b that open in a direction tangent to the rotation direction of the blades. The one exhaust port 86a opens toward the vent 22 of the body 14, and the other exhaust port 86b toward the electromotive section 52.

Further, the power generation section is provided with a concentration sensor 88 for detecting the concentration of the fuel stored in the mixing tank 54 and a concentration sensor cooler 87 for cooling the fuel delivered to the concentration sensor.

As shown in FIG. 4, the first and second liquid pumps 56 and 68, air pump 64, water recovery pump 76, air valve 62, exhaust valve 81, and cooling fans 82, which constitute the power generation section, are connected electrically to a control section 30 and controlled by the control section. The water level sensor 77 and the concentration sensor 88 are connected to the control section 30 and output their respective detection signals to the control section. Wires that connect these electrical parts and sensors with the control section 30 are pulled around from inside the body 14 into bearer portion 16.

If the fuel cell 10 constructed in this manner is used as the power source for the personal computer 11, the rear end portion of the computer is first placed on the bearer portion 16 of the fuel cell, locked in a predetermined position, and connected electrically to the fuel cell by the connector 32. Power generation in the fuel cell 10 is started in this state. In this case, high-concentration methanol is supplied from the fuel tank 50 to the mixing tank 54 by the first liquid pump 56 and mixed with water as a solvent refluxed from the electromotive section 52, whereby it is diluted to a given concentration. The methanol diluted in the mixing tank 54 is supplied through the anode line to the anode 58a of the electromotive section 52 by the second liquid pump 68. Air is supplied to the cathode 58b of the electromotive section 52 by the air pump 64. As shown in FIG. 6, the supplied methanol and water chemically react with each other in the electrolyte membrane 60 between the anode 58a and the cathode 58b, whereupon electric power is generated between the anode and the cathode. The power generated in the electromotive section 52 is supplied to the personal computer 11 through the control section 30 and the connector 32.

With the progress of the power generation reaction, carbon dioxide and water are produced as reaction products on the sides of the anode 58a and the cathode 58b, respectively, in the electromotive section 52. The carbon dioxide produced on the anode side and an unaffected portion of the methanol are delivered to the anode line, cooled through the anode cooler 70, and then refluxed into the mixing tank 54. The carbon dioxide is gasified in the mixing tank 54 and discharged to the outside through the cathode cooler 75, exhaust valve 81, and finally, the exhaust port 78.

As shown in FIG. 7, most of the water produced on the side of the cathode 58b is reduced to steam, which is discharged together with air into the cathode line. The discharged water and steam pass through the first line 72a, and the water is fed into the reservoir portion 72c. The steam and air flow upward through the branch lines 72b to the second line 72e. As this happens, the steam that flows through the branch lines 72b is cooled and condensed by the cathode cooler 75. The water produced by the condensation flows downward in the branch lines 72b by gravity and is recovered into the reservoir portion 72c. The water recovered in the reservoir portion 72c is delivered to the mixing tank 54 by the water recovery pump 76, mixed with the methanol, and supplied again to the electromotive section 52.

Some of the air and steam delivered to the second line 72e is fed into the water recovery portion 28. As this is done, the steam is condensed into dew in the second line 72e, and the resulting water is recovered into the water recovery portion 28. The air and the methanol splashed in the air are delivered to the exhaust filter 80, whereupon the methanol is removed by the filter. The air passes through the exhaust valve 81 and is discharged into the body 14 through the exhaust port 78, and moreover, to the outside through the vent 22 of the body. The carbon dioxide discharged from the anode side of the electromotive section 52 passes through the second line 72e and is discharged into the body 14 through the exhaust port 78, and moreover, to the outside through the vent 22 of the body.

During the operation of the fuel cell 10, the cooling fan 82 is driven so that the outside air is introduced into the body 14 through the vents 20 and the vents 21 in the body. As shown in FIGS. 5 and 7, the outside air introduced into the body 14 through the vents 20 and the air in the body 14 pass around the anode cooler 70, thereby cooling it, and are then drawn into the fan case through one of the suction ports 84 of the cooling fan 82. The outside air introduced into the body 14 through the vents 21 and the air in the body 14 pass around the anode cooler 70, thereby cooling it, and are then drawn into the fan case through the other suction port 84.

The air drawn into the fan case is discharged through the exhaust ports 86a and 86b into the body 14. The air discharged through the exhaust port 86a passes through the body 14 and is discharged to the outside through the vent 22 of the body. As this is done, the air discharged through the exhaust port 86a is mixed with air and carbon dioxide that are discharged through the exhaust port 78 of the cathode line, and the resulting mixture is discharged through the vent 22 to the outside of the body. Further, the air discharged through the exhaust port 86a cools the electromotive section 52 and its surroundings and is then discharged to the outside of the body 14.

The concentration of the methanol in the mixing tank 54 is detected by the concentration sensor 88. Based on the detected concentration, the control section 30 actuates the water recovery pump 76 to supply the water in the reservoir portion 72c to the mixing tank 54, thereby keeping the methanol concentration constant. The amount of water recovered in the cathode line, that is, the amount of condensed steam, is adjusted by controlling the cooling capacity of the cathode cooler 75, depending on the level of the water recovered in the reservoir portion 72c. In this case, the cooling capacity of the cathode cooler 75 is adjusted by controlling the driving voltage of the cooling fan 82 according to the water level detected by the water level sensor 77. In this way, the amount of water recovery is controlled.

As the water is recovered in the manner shown in FIG. 7, the water recovery pump 76 is rotated forward by the control section 30. Thereupon, the check valve 42 opens, and the check valve 44 closes. The water in the reservoir portion 72c is delivered to the mixing tank 54 via the first recovery line 72d and the check valve 42. As this is done, the water in the reservoir portion 72c never flows back toward the exhaust filter 80, since the second recovery line 72f is provided with the check valve 44.

Figure 8:
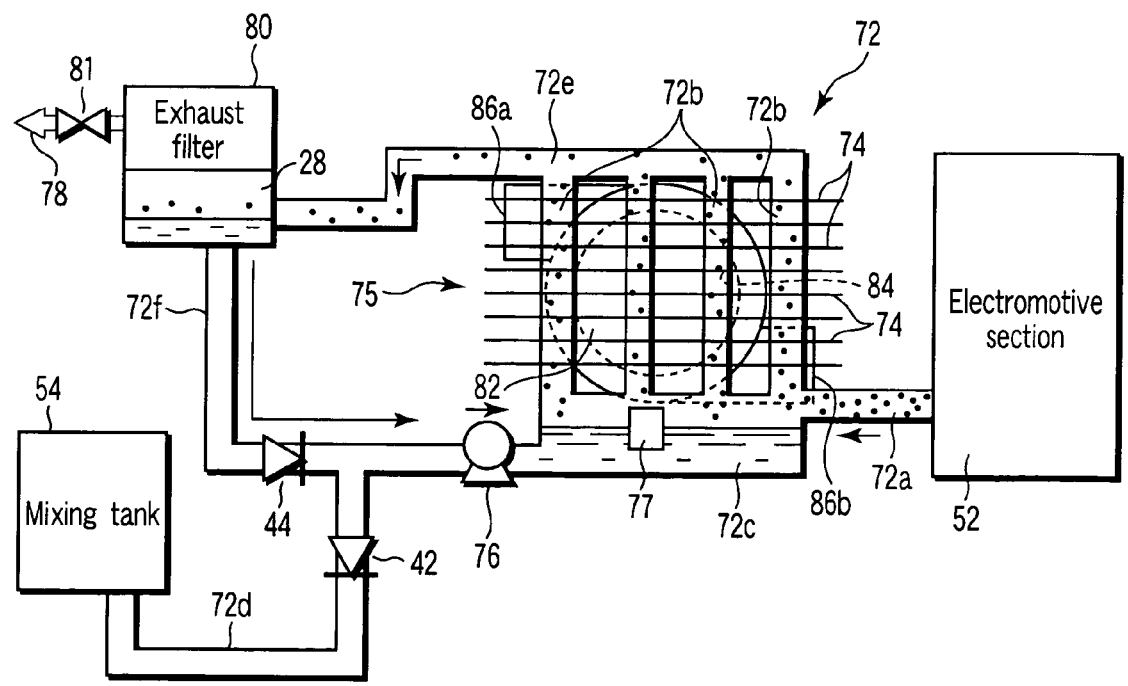
FIG. 8 is an exemplary diagram typically showing the cathode line and the cathode cooler of the fuel cell.

On the other hand, the control section 30 drives the water recovery pump 76 for reverse rotation for a given time at every given operating period, whereupon the water collected in the water recovery portion 28 is recovered into the reservoir portion 72c. Thus, when the water recovery pump 76 is reversed, as shown in FIG. 8, the check valve 44 opens, and the check valve 42 closes. The water collected in the water recovery portion 28 and the water produced by condensation in the second line 72e are recovered into the reservoir portion 72c through the second recovery line 72f, check valve 44, and the first recovery line 72d. Thereafter, the recovered water is supplied to the mixing tank 54 and used for the dilution of the methanol.

According to the fuel cell 10 constructed in this manner, the condensed liquid produced in the cathode line is recovered before it is delivered to the exhaust filter 80 after having passed through the cathode cooler 75, whereby water can be prevented from flowing into the filter 80. Thus, the performance of the exhaust filter 80 can be prevented from being lowered, so that the resulting fuel cell can ensure prolonged stable power generation. Further, additionally condensed water can be recovered after the condensation in the cathode cooler 75, so that the water recovery efficiency of the fuel cell of the dilution-circulation type is improved. Thus, the problem of water shortage is solved, so that fuel of a desired concentration can be supplied to the mixing tank 54. Thus, stable power generation can be performed for a long period.

According to the fuel cell 10 described above, moreover, the water in the reservoir portion 72c and moisture produced immediately before the exhaust filter 80 is reached can be recovered by jointly using the common water recovery pump 76 and the check valves 42 and 44. Thus, water can be efficiently recovered without additionally using any dedicated pump, so that increases in the power consumption and the number of essential components can be prevented.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Although the power generation section includes the fuel tank 50, electromotive section 52, anode cooler 70, cathode cooler 75, and mixing tank 54 that are arranged in the order named, according to the embodiment described above, this order of arrangement may be changed variously as required. In the present embodiment, the power generation section is provided with the fuel tank and the mixing tank. Alternatively, however, the fuel tank may be configured to double as a mixing tank so that the mixing tank can be omitted. In this specification, the fuel tank is described as a container that contains and supplies the fuel and as including the fuel tank and/or the mixing tank.

The fuel cell according to this invention may also be used as a power source for any other electronic devices than the personal computer described herein, such as mobile devices, portable terminals, etc. The type of fuel cell is not limited to the DMFC but may be any other type, such as a PEFC (polymer electrolyte fuel cell). The cooling fan is not limited to the centrifugal fan but may be an axial-flow fan.

What is claimed is:

1. A fuel cell comprising:
    an electromotive section which generates electric power through a chemical reaction;
    a fuel tank which contains a fuel;
    an anode line through which the fuel is circulated between the electromotive section and the fuel tank;
    an air supply section which supplies air to the electromotive section;
    a cathode line which is connected to the electromotive section and through which products from the electromotive section are discharged;
    a cooler which is arranged in the cathode line, cools the products, and condenses water;
    an exhaust filter provided in the cathode line on the downstream side of the cooler;
    a reservoir portion which stores the condensed water and water discharged from the electromotive section;
    a first recovery line through which the water stored in the reservoir portion is guided into the fuel tank; and
    a second recovery line through which the water produced in the cathode line is guided into the reservoir portion between the cooler and the exhaust filter.

2. The fuel cell according to claim 1, which further comprises a water recovery pump provided at the first recovery line, a first check valve which is arranged in the first recovery line between the water recovery pump and the fuel tank and restrains the water from flowing back from the fuel tank to the reservoir portion, a second check valve which is arranged in the second recovery line and restrains the water from flowing back from the water recovery pump to the exhaust filter, and a control section which drives the water recovery pump to rotates forward and feed the water in the reservoir portion into the fuel tank, and drives the water recovery pump to rotate reversely and feed the water through the second water recovery line into the reservoir portion.

3. The fuel cell according to claim 1, which further comprises a water recovery portion which is arranged vertically under the exhaust filter and stores the water produced in the cathode line between the cooler and the exhaust filter, the second recovery line being connected to the water recovery portion.

4. The fuel cell according to claim 2, which further comprises a water level sensor which is located in the reservoir portion and detects a level of the water in the reservoir portion, and the control section controls the drive of the water recovery pump based on the water level detected by the water level sensor.

5. The fuel cell according to claim 2, wherein the fuel tank includes a mixing tank in which the fuel and the water are mixed, the cathode line being connected to the mixing tank.

* * * * *